(12) United States Patent
Riesland

(10) Patent No.: US 9,414,581 B1
(45) Date of Patent: Aug. 16, 2016

(54) PEST DETERRENT APPARATUS AND METHOD

(71) Applicant: Joshua Ramsey Riesland, Yuma, AZ (US)

(72) Inventor: Joshua Ramsey Riesland, Yuma, AZ (US)

( * ) Notice: Subject to any disclaimer, the term of this patent is extended or adjusted under 35 U.S.C. 154(b) by 0 days.

(21) Appl. No.: 14/808,288

(22) Filed: Jul. 24, 2015

Related U.S. Application Data

(60) Provisional application No. 62/031,541, filed on Jul. 31, 2014.

(51) Int. Cl.
*A01M 29/08* (2011.01)
*A01M 29/10* (2011.01)
*G01S 19/14* (2010.01)

(52) U.S. Cl.
CPC ............... *A01M 29/08* (2013.01); *A01M 29/10* (2013.01); *G01S 19/14* (2013.01)

(58) Field of Classification Search
CPC .............................. A01M 29/10; A01M 29/08
USPC ........ 119/713, 719, 720, 721, 666; 116/22 A; 340/573.1; 52/101; 367/139
See application file for complete search history.

(56) References Cited

U.S. PATENT DOCUMENTS

| | | | | |
|---|---|---|---|---|
| 5,343,652 | A * | 9/1994 | Johnson | A01M 1/02 43/132.1 |
| 5,986,551 | A * | 11/1999 | Pueyo | A01M 29/16 119/713 |
| 6,575,597 | B1 * | 6/2003 | Cramer | F21L 11/00 116/22 A |
| 6,625,918 | B2 | 9/2003 | Bhullar | |
| 7,690,146 | B2 * | 4/2010 | Jong | A01M 29/16 116/22 A |
| 9,013,961 | B1 * | 4/2015 | Nicholson | A01M 29/22 367/139 |
| 2013/0050507 | A1 * | 2/2013 | Syed | H04N 1/00137 348/207.1 |
| 2016/0044910 | A1 * | 2/2016 | Lang | A01M 29/10 119/713 |
| 2016/0128315 | A1 * | 5/2016 | Henskes | A01M 29/10 119/713 |

FOREIGN PATENT DOCUMENTS

| | | |
|---|---|---|
| WO | WO9711600 | 4/1997 |
| WO | WO03075652 A1 | 9/2003 |
| WO | WO2007033386 A1 | 3/2007 |

* cited by examiner

*Primary Examiner* — Yvonne Abbott-Lewis
(74) *Attorney, Agent, or Firm* — Schmeiser, Olsen & Watts LLP

(57) ABSTRACT

A pest deterrent apparatus that uses a rotating mirror to paint a beam of sunlight onto a predetermined area of interest. The beam of sunlight being reflected onto the area of interest deters birds and other pests from landing or gathering in the area of interest. A global navigation satellite system (GNSS) device and a compass are used to determine the position of the sun with respect to the mirror. A pattern generator computes the movement of the mirror required to paint the predetermined area of interest with the beam of sunlight. The movement of the mirror is adjusted as the sun moves across the sky such that the predetermined area of interest continues to be covered with the beam of sunlight as the sun moves across the sky.

20 Claims, 9 Drawing Sheets

PEST DETERRENT APPARATUS AND METHOD

CROSS-REFERENCE TO RELATED APPLICATION

This application claims priority to U.S. Patent Application No. 62/031,541, filed Jul. 31, 2014 entitled "Bird Deterrent Apparatus", which is incorporated herein by reference.

BACKGROUND OF THE INVENTION

1. Technical Field

This invention relates to devices for deterring pests, such as birds, from gathering in a designated area of interest, more specifically, to a device which uses a mirror to reflect a beam of sunlight onto the designated area, and a global navigation satellite system for guiding the motion of the mirror.

2. State of the Art

Pests can do a tremendous amount of damage to crops, buildings, homes and parks. Keeping pests, such as birds, from landing on crop areas is a continuous job for farmers and gardeners. Homeowners, parks, and building owners also continue to seek effective methods to deter birds and other pests from gathering in particular areas of interest. Devices which randomly reflect sunlight tend to do a fair job of scaring birds from around the device. But they lack the ability to direct the reflected sunlight to a specific area, while blocking the sunlight from being directed to another area where the sunlight is not wanted.

Accordingly, what is needed is a device that can continuously paint an area of interest with a moving beam of sunlight to keep pests such as birds from gathering or landing in the area of interest. What is also needed is the ability to block the sunlight from hitting a predetermined dark area that should not receive the beam of sunlight.

DETAILED DESCRIPTION OF EMBODIMENTS OF THE INVENTION

Figure 1:
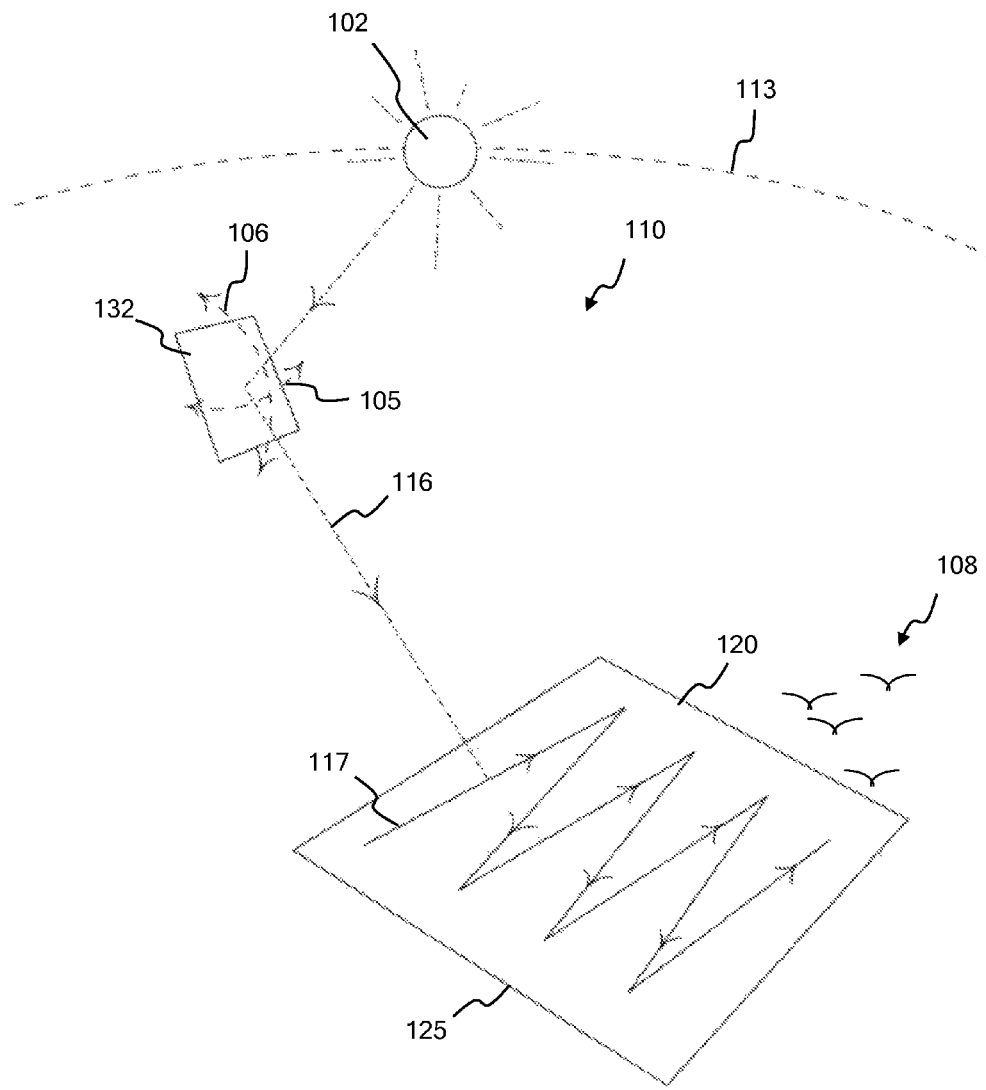
FIG. 1 shows an embodiment of a pest deterrent apparatus.

As discussed above, embodiments of the present invention relate to devices and methods to deter pests from landing in a particular area of interest. Described is a pest deterrent apparatus which includes one or more moving mirrors that reflect a beam of sunlight onto a predetermined area of interest. The moving beam of sunlight is painted onto (lands on, is reflected onto) the predetermined area of interest by the moving mirrors. The sunlight frightens and startles birds, keeping them from landing in the predetermined area of interest. The pest deterrent apparatus includes a global navigation satellite system (GNSS) device and a compass, which allows the pest deterrent apparatus to determine its location on the earth, its position relative to the sun, the position of the sun relative to the mirrors, and the orientation of the mirrors relative to the area of interest. The pest deterrent apparatus may also include an accelerometer mounted on or near each mirror, which provides information on the attitude or orientation of each mirror. Information from the GNSS device and the compass is used by a processor to calculate the orientation and motion of the mirrors required to paint the beam of sunlight on the area of interest, and to keep the area of interest painted with the beam of sunlight as the sun moves across the sky.

The pest deterrent apparatus may also prevent sunlight from being painted onto a predetermined dark area. The processor uses the location of the predetermined dark area to control the motion of the mirrors such that the beam of sunlight is blocked from being painted on the predetermined dark area. The pest deterrent apparatus may move the mirror or mirrors such that the sunlight is directed to a predetermined blanking area instead of allowing the beam of sunlight to travel through the predetermined dark area. This allows a user of the pest deterrent device to block sunlight from being painted on (falling onto, landing on) a predetermined dark area which should not receive the bright beams of sunlight. Predetermined dark areas often include buildings, people, homes, or other items which should not receive the beam of sunlight.

Because sunlight is used as the light source, the pest deterrent apparatus can be low power. The pest deterrent apparatus can use solar panels to power the processor, the GNSS device, and the mirror motion controllers.

The pest deterrent apparatus can be mobile. A mobile pest deterrent apparatus can be placed in any location in or around the predetermined area of interest, and moved from one predetermined area of interest to another. The pest deterrent apparatus will determine its own location on the earth, where the sun is in relation to the mirrors, and how to move the mirrors to paint the predetermined area of interest with the beam of sunlight, while blocking the predetermined dark area from receiving the beam of sunlight.

Keeping pests such as birds from crops and other areas has been a perpetual task for mankind. Birds and other pests can do substantial damage to growing crops, stored crops, homes, stores and other buildings, for example. Pests eat crops, contribute to the infestation of insects in homes and buildings, and damage structures, land, and water areas with bird and insect droppings. The well-known scarecrow can work in some situations to keep birds away. But birds get used to any object that does not move periodically, such as a scarecrow. Thus, scarecrows lose their effectiveness at scaring away birds after some time. Birds, rabbits, and some insects are startled by movement and reflections off bright objects, or certain sounds. Moving objects are used to scare birds, and in particular moving objects which reflect light. Bright moving lights tend to startle birds and make them fly away. Objects which reflect light randomly have become popular. However, with all of these devices already in use, it is not possible to tailor the boundaries of the area that they deter birds from. Noise-making devices have been used to keep birds and insects away, but their noises can be annoying to people as well as birds, and again, it is difficult to tailor the area from which the pests are frightened. What is needed is a device that can direct light to a specific predetermined area and continuously paint the area with light, scaring birds and other pests away. It is also desirable to have a device that is capable of preventing the light from reaching a dark area that should not receive the reflected sunlight.

Figure 2:
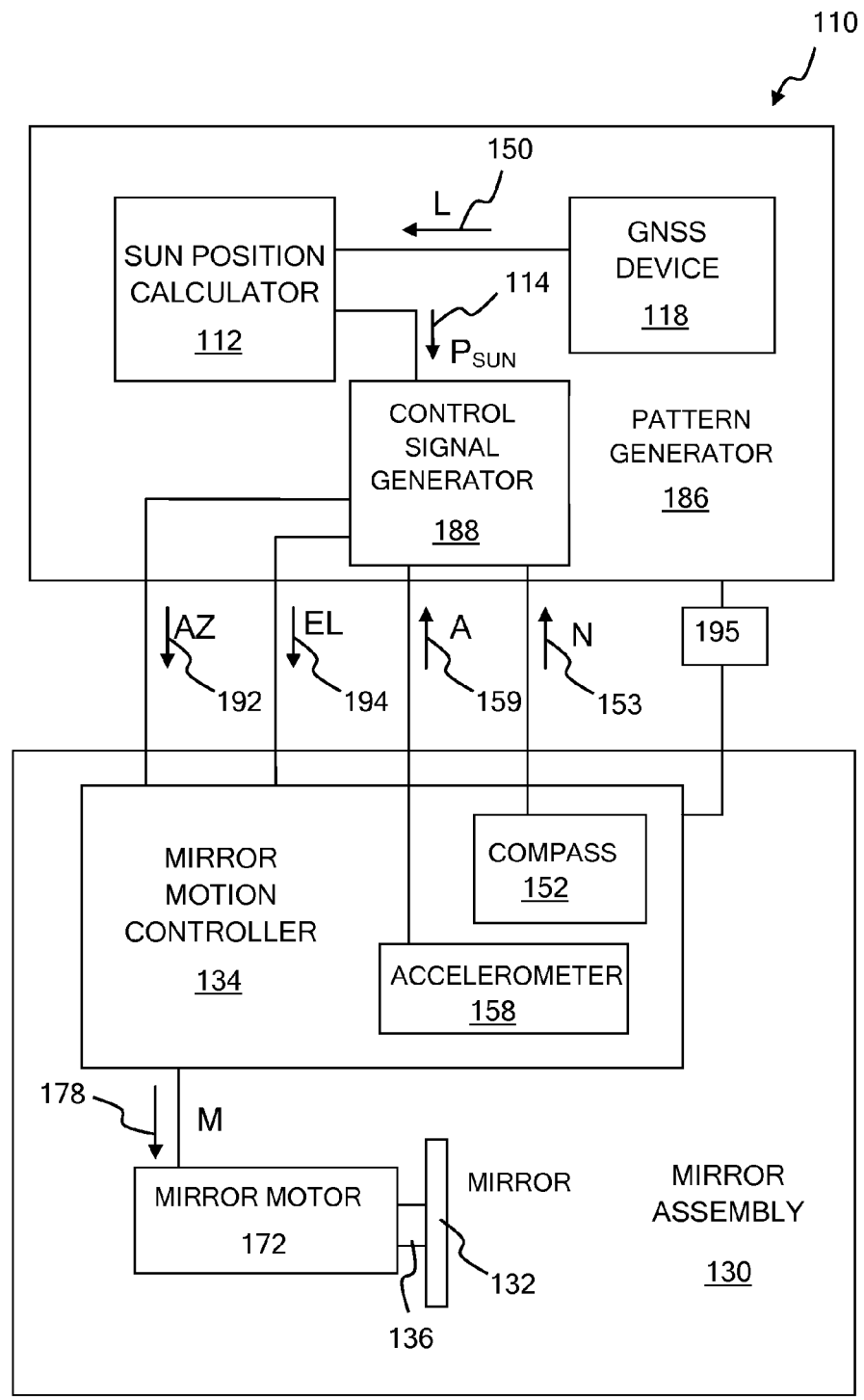
FIG. 2 shows a simplified block diagram of the pest deterrent apparatus of FIG. 1.

FIG. 1 and FIG. 2 show details of an embodiment of a pest deterrent apparatus 110. FIG. 1 shows a simplified diagram of the operation of pest deterrent apparatus 110. FIG. 2 shows a simplified block diagram of pest deterrent apparatus 110 of FIG. 1. Pest deterrent apparatus 110 of FIG. 1 includes a mirror 132. Mirror 132 moves in at least two axes of rotation. In this embodiment mirror 132 moves in an azimuthal axis of rotation (tilt) 105 and an elevational axis of rotation 106 to paint a beam of sunlight 116 from sun 102 onto a predetermined area of interest 120. Birds 108 are startled by beam of sunlight 116, so that they do not land or gather in a predetermined area of interest 120. Beam of sunlight 116 can be painted onto predetermined area of interest 120 in many different patterns. In this embodiment, beam of sunlight 116 is painted onto predetermined area of interest 120 in a pattern 117.

In the embodiment shown in FIG. 1, pest deterrent apparatus 110 is used as a bird deterrent apparatus to deter birds 108, but it is to be understood that pest deterrent apparatus 110 can be used to deter any pests, such as animals, insects, people, or other pests, from gathering or landing in predetermined area of interest 120.

Mirror 132 in the embodiment shown in FIG. 1 rotates (moves) in two axes of rotation to paint beam of sunlight 116 onto predetermined area of interest 120. This two axis rotation of mirror 132 is an example only, and it is to be understood that mirror 132 can be made to move in many different axes, rotational movement, or other types of movement which can paint, using raster movement or vector movement, for example, beam of sunlight 116 onto predetermined are of interest 120. Pattern 117 can be any type of pattern that paints predetermined area of interest with beam of sunlight 116. "Paint" and "painting" in this document are used to describe beam of sunlight 116 falling on and moving within a predetermined area of interest such that, over time, beam of sunlight 116 touches most or all of the predetermined area of interest with beam of sunlight 116. Beam of sunlight 116 is painted onto predetermined area of interest 120 so that a pest anywhere within predetermined area of interest 120 is frightened or startled and moves outside of predetermined area of interest 120. "Painting" beam of sunlight 116 onto predetermined area of interest 120 means reflecting beam of sunlight 116 onto predetermined area of interest 120, for example, and also covering predetermined area of interests 120 with moving beam of sunlight 116. The movement of beam of sunlight 116 ensures that pests in all regions within predetermined area of interest 120 are deterred, and yet pest deterrent apparatus 110 does not move beam of sunlight 116 outside of predetermined area of interest, so that the area within which pests are deterred is controlled and contained by pest deterrent apparatus 110.

Predetermined area of interest 120 is bounded by a perimeter 125, which can be defined by GNSS coordinates, for example. Predetermined area of interest 120 can be any area within which it is desirable to deter pests, insects, or birds from landing or gathering. Predetermined area of interest 120 can be a field of crops, homes, buildings, areas of stored crops, lawns, gardens, parks, or any other area where birds are not wanted. Predetermined area of interest 120 can be a predetermined area of the earth. Predetermined area of interest 120 can be any size, shape location, or geometry. Perimeter 125 can be any size, shape or geometry. The specific geometries shown in this document are examples only. In some embodiments predetermined area of interest 120 includes more than one continuous area, see for instance, FIG. 9 and its description. Predetermined area of interest 120 can be an area of the earth, and area in the sky, an area of a building, or any other predetermined area on or in the earth.

FIG. 1 does not show the details of the mirror mount or rotational mechanisms of mirror 132, in order to simplify the drawing. Any type of mirror mount and movement mechanisms can be used, as is known in the art now or in the future. Details of a specific mirror rotation and mount mechanism are described below in relation to pest deterrent apparatus 310, as an example of the type of mechanical system that can be used to move mirrors of a pest deterrent apparatus.

The movement of mirror 132 is adjusted over time and as the sun 102 moves in a path 113 across the sky. The movement of mirror 132 is adjusted such that beam of sunlight 116 continues to paint pattern 117 on predetermined area of interest 120 as sun 102 moves. The movement of mirror 132 repeatedly paints beam of sunlight 116 on predetermined area of interest 120, and does not let beam of sunlight 116 to be painted outside of area of interest 120, even as sun 102 moves across the sky. Mirror 132 moves such that beam of sunlight 116 paints predetermined are of interest repeatedly in a period of time that does not let pests get comfortable in predetermined area of interest 120. In some embodiments, mirror 132 paints beam of sunlight 116 on the complete predetermined area of interest 120 once every second. In some embodiments, mirror 132 paints beam of sunlight 116 on the complete predetermined area of interest 120 several times every second. In some embodiments, mirror 132 paints beam of sunlight 116 on the complete predetermined area of interest 120 once every minute. The timing of the painting of beam of sunlight 116 onto predetermined are of interest is determined by the type and habits of the particular pests being deterred. In some embodiments, it may only be necessary to paint beam of sunlight 116 onto predetermined area of interest 120 every few minutes or hours. In some embodiments, it may be necessary to paint beam of sunlight 116 onto predetermined area of interest 120 repeatedly every second, in order to deter a specific type of pests.

FIG. 2 shows a simplified block diagram of pest deterrent apparatus 110 of FIG. 1. Pest deterrent apparatus 110 includes a pattern generator 186, a mirror assembly 130, and a power source 195. Mirror assembly 130 includes mirror 132 and the electronics and mirror mounts that hold and move mirror 132. Power source 195 provides power to both pattern generator 186 and mirror assembly 130.

Pattern generator 186 is the electronics that computes the position of sun 102 in its path 113, the location of pest deterrent apparatus 110 on the earth, the position of predetermined area of interest 120 with respect to pest deterrent apparatus 110, and the movement of mirror 132 required to paint beam of sunlight 116 into predetermined area of interest 120. Pattern generator 186 receives a magnetic North signal N from a compass 152 coupled to mirror assembly 130, and an accelerometer signal A from an accelerometer 158 coupled to mirror assembly 130. Magnetic North signal N is labeled 153 in the drawings. Accelerometer signal A is labeled 159 in the drawings. Magnetic North signal 153 and accelerometer signal 159 are used to help determine the location and attitude of mirror 132 and pest deterrent apparatus 110 with respect to sun 102 and predetermined area of interest 120. Pattern generator 186 receives magnetic North signal 153 from compass 152, and accelerometer signal 159 from accelerometer 158, and sends an azimuth signal AZ and an elevation signal EL to mirror assembly 130 in response. Azimuth signal AZ is labeled 192 in the drawings. Elevation signal EL is labeled 194 in the drawings. Azimuth signal 192 and elevation signal 194 provide mirror assembly 130 the mirror movements in azimuth axis of rotation 105 and elevation axis of rotation 106 required to paint beam of sunlight 116 onto predetermined area of interest 120.

Pattern generator 186 includes a sun position calculator 112, a GNSS device 118, and a control signal generator 188. Sun position calculator 112 outputs a sun position signal 114.

Sun position calculator 112 is an electronic circuit that determines the position of sun 102 in its path 113, and provides sun position signal $P_{SUN}$ to control signal generator 188. Sun position signal $P_{SUN}$ is labeled 114 in the drawings. Sun position calculator 112 in this embodiment includes a processor. Sun position calculator 112 uses location signal 150 from GNSS device 118, and the time, to determine the azimuth and elevation position of the sun. This information is sent as sun position signal 114 to control signal generator 188. In some embodiments, sun position calculator 112 uses other devices or methods to determine the position of sun 102 in the sky. Pattern generator 186 causes mirror 132 to move such that beam of sunlight 116 reflected off mirror 132 is painted onto predetermined area of interest 120 in response to sun position calculator 112 outputting sun position 114.

Sun position calculator 112 updates sun position 114 periodically so that the movement of mirror 132 is adjusted to maintain beam of sunlight 116 in its painted pattern 117 as sun 102 moves in its path 113 across the sky (see FIG. 1). Sun position calculator 112 updates sun position 150 periodically, and pattern generator 186 adjusts the movement of mirror 132 by adjusting azimuth signal 192 and elevation signal 194 such that mirror 132 paints beam of sunlight 116 onto predetermined area of interest 120 as sun 102 moves across the sky.

GNSS device 118 provides a location signal L to sun position calculator 112. Location signal L is labeled 150 in the drawings. Location signal 150 is the GNSS coordinates (the GNSS location) of GNSS device 118. Location signal 150 describes the location of GNSS device 118, which can be used to determine the location of pest deterrent apparatus 110, mirror 132, and any other elements of pest deterrent apparatus 110 which have known positions relative to GNSS device 118. GNSS device 118 computes location 150 of GNSS device 118 using signals from GNSS satellites, as is known in the art of GNSS devices. GNSS device 118 can be any type of GNSS device known now or in the future, such as a global positioning system (GPS) device, or a GNSS device that uses one or more of the other GNSS satellite constellations to determine location. In this embodiment GNSS device 118 is a GPS device and location signal 150 is the GPS coordinates of GNSS device 118.

GNSS device 118 provides pest deterrent apparatus 110 the ability to determine its own location, and the location of the sun with respect to mirror 132. Pest deterrent apparatus 110 can be moved from one field of crops to another, for example, and determine for itself where it is located, the position of the sun relative to itself, and its location relative to predetermined area of interest 120. Pest deterrent apparatus 110 will use GNSS device 118 to determine where pest deterrent apparatus 110 is located, and calibrate the movement of mirror 132 based on location 150. GNSS device 118 increases the intelligence, flexibility, and accuracy of pest deterrent apparatus 110 relative to bird and pest deterrent devices which do not have GNSS devices.

In some embodiments, pest deterrent apparatus 110 includes more than one GNSS device 118. Multiple GNSS devices can be used to determine the attitude of one or more mirrors, the location of one or more mirrors, the attitude of pest deterrent apparatus 110, or the location or attitude of any number of the elements of pest deterrent apparatus 110. In some embodiments GNSS device 118 is not located in the same location as mirror 132. In these embodiments, the orientation of mirror 132 with respect to GNSS device 118 is generally known and defined by the geometry of pest deterrent apparatus 110. The location of mirror 132, and any other part or element of pest deterrent apparatus 110, can be computed based on the location 150 of GNSS device 118 and the known geometry of pest deterrent apparatus 110.

In some embodiments, pest deterrent apparatus 110 does not include GNSS device 118. In some embodiments the location of pest deterrent apparatus 110 can be programmed into sun position sensor 112, for example, or other elements of pattern generator 186. The key locations can be entered into mirror controller 134 and/or sun position sensor 112 when and if GNSS device 118 is not available or not used. However, having GNSS device 118 be an element of pest deterrent apparatus 110 makes pest deterrent apparatus 110 more flexible and smarter at determining its own location and how to program the movement of mirror 132.

Control signal generator 188 is electrically coupled to mirror assembly 130 and sun position calculator 112. Control signal generator 188 uses sun position signal 114, magnetic North signal 153 from compass 152, and attitude signal 159 from accelerometer 158 to compute azimuth signal 192 and elevation signal 194. Azimuth signal 192 and elevation signal 194 provide the azimuthal and elevational rotation instructions for mirror 132 to paint beam of sunlight 116 onto predetermined area of interest 120. Azimuth signal 192 and elevation signal 194 are output from control signal generator 188 of pattern generator 186 and conducted to mirror assembly 130. Control signal generator 188 causes mirror 132 to move such that beam of sunlight 116 reflected off mirror 132 is painted onto predetermined are of interest 120, by providing azimuth signal 192 and elevation signal 194 to mirror assembly 130, and specifically to a mirror motion controller 134 of mirror assembly 130.

Pest deterrent apparatus 110 includes mirror assembly 130, which includes mirror 132. Mirror assembly 130 is shown in block diagram form in FIG. 2. Mirror assembly 130 includes mirror 132, a mirror mount 136, a mirror motor 172, a mirror motion controller 134, compass 152, and accelerometer 158. Mirror 132 is mechanically coupled to mirror motor 172 using mirror mount 136. Mirror motor 172 rotates mirror mount 136 and mirror 132 in response to receiving a mirror motion signal 178 from mirror motion controller 134.

Mirror motion controller 134 is mechanically coupled to mirror assembly 130. Mirror motion controller 134 in this embodiment is an electronic circuit board that includes the electronics for driving mirror motor 172. Mirror motion controller 134 in this embodiment includes compass 152 and accelerometer 158. Compass 152 determines magnetic North, and sends magnetic North signal 153 to pattern generator 186 as discussed above. Accelerometer 158 determines the orientation of mirror motion controller 134 mounted to mirror assembly 130, and sends this information as attitude signal 159 to pattern generator 186.

Mirror motion controller 134 receives azimuth signal 192 and elevation signal 194 from pattern generator 186, and outputs mirror motion signal M in response. Mirror motion signal M is labeled 178 in the figures. Mirror motion signal 178 includes the commands sent to mirror motor 172 to move mirror mount 136 and mirror 132 such that beam of sunlight 116 (FIG. 1) is reflected off of mirror 132 and painted onto predetermined area of interest 120. Mirror motor 172 is electrically coupled to mirror motion controller 134, and mechanically coupled to mirror 132 with mirror mount 136. Mirror motor 172 converts the electrical mirror motion signals 178 into mechanical rotation motion of mirror 132. Mirror motion controller 134, mirror motor 172, and mirror mount 136 rotate mirror 132, which rotation paints beam of sunlight 116 onto predetermined area of interest 120, in response to mirror controller 134 receiving azimuth signal 192 and elevation signal 194 from pattern generator 186.

Mirror 132 is rotated in at least two axes, as shown in FIG. 1. Mirror 132 in this embodiment is rotated about a first axis of rotation 105 and a second axis of rotation 106. In this embodiment, first axis of rotation 105 is an azimuthal rotation, and second axis of rotation 106 is an elevational rotation, but this is not meant to be limiting. The controlled motion of mirror 132 in azimuthal axis of rotation 105 and elevational axis of rotation 106 allows mirror 132 to paint beam of sunlight 116 in any pattern onto predetermined area of interest 120. The repeated controlled painting of beam of sunlight 116 onto predetermined area of interest 120 keeps birds 108, or other pests, from landing or gathering in predetermined area of interest 120, and prevents damage from birds 108 to predetermined area of interest 120. In this embodiment, mirror 132 paints beam of sunlight 116 onto predetermined area of interest 120 in pattern 117. It is to be understood that beam of sunlight 116 can be painted onto predetermined area 120 in any pattern, and that the pattern can change over time. The pattern 117 that beam of sunlight 116 paints onto predetermined area of interest 120 is chosen based on the size and shape of predetermined area of interest 120, and where beam of sunlight 116 will be most effective at keeping away birds or other pests.

In some embodiments, pest deterrent apparatus 110 includes more than one mirror. See, for example, pest deterrent apparatus 310 shown in FIG. 3 through FIG. 8 and described in the accompanying text. Pest deterrent apparatus 110 can include one or more than one mirror, each of which reflects a beam of sunlight off a particular mirror onto a predetermined area of interest. In some embodiments, each mirror reflects a unique beam of sunlight onto a unique predetermined area of interest. In some embodiments, one or more mirrors cooperate to paint a beam of sunlight onto the same predetermined area of interest.

In some embodiments, pest deterrent apparatus 110 continuously paints beam of sunlight 116 onto area of interest 120 from sunrise to sunset. In other embodiments, pest deterrent apparatus 110 paints beam of sunlight 116 onto area of interest 120 for a preprogrammed period of time. In some embodiments, pattern generator 188 is programmed with the GNSS coordinates of perimeter 125 of area of interest 120, which helps mirror motion controller 134 paint beam of sunlight 116 accurately and repeatedly onto area of interest 120. In some embodiments, pattern generator 186 learns perimeter 120 by an individual manually moving mirror 132 to paint beam of sunlight 116 along perimeter 120.

Sun position calculator 112 updates sun position signal 114 periodically, and control signal generator 188 adjusts the movement of mirror assembly 130 and mirror 132 accordingly, to account for the movement of sun 102 in its path 113 across the sky.

It is to be understood that pest deterrent apparatus 110 can be used with light sources other than sun 102. Using sun 102 as a light source is convenient and low-power, but in some applications it may be desirable to use a different light source. Pest deterrent apparatus 110 can be programmed to collect and reflect light from many different light sources. In these embodiments, sun position calculator 112 is replaced with a light source position calculator, which can provide the position of the light source relative to mirror 132, so that control signal generator 188 and mirror motion controller 134 can direct mirror 132 to collect and reflect light from the light source onto area of interest 120 just as it does from sun 102. In some embodiments, the position of the light source is given by a GNSS location. In some embodiments, the light source is a laser. In some embodiments, the light source is some other type of light emitting device. In some embodiments, more than one light source is used.

FIG. 3 through FIG. 8 shows an embodiment of a pest deterrent apparatus 310. Pest deterrent apparatus 310 is similar to pest deterrent apparatus 110 and like numbers are used to indicate like elements. Pest deterrent apparatus 310 is used, in some embodiments, in place of pest deterrent apparatus 110 in the system shown in FIG. 1. In an embodiment where pest deterrent apparatus 310 replaces pest deterrent apparatus 110 of FIG. 1, pest deterrent apparatus 310 is used as a bird deterrent apparatus to deter birds 108, but it is to be understood that pest deterrent apparatus 310 can be used to deter any pests, such as animals, insects, people, or other pests, from gathering or landing in predetermined area of interest 120.

Figure 3:
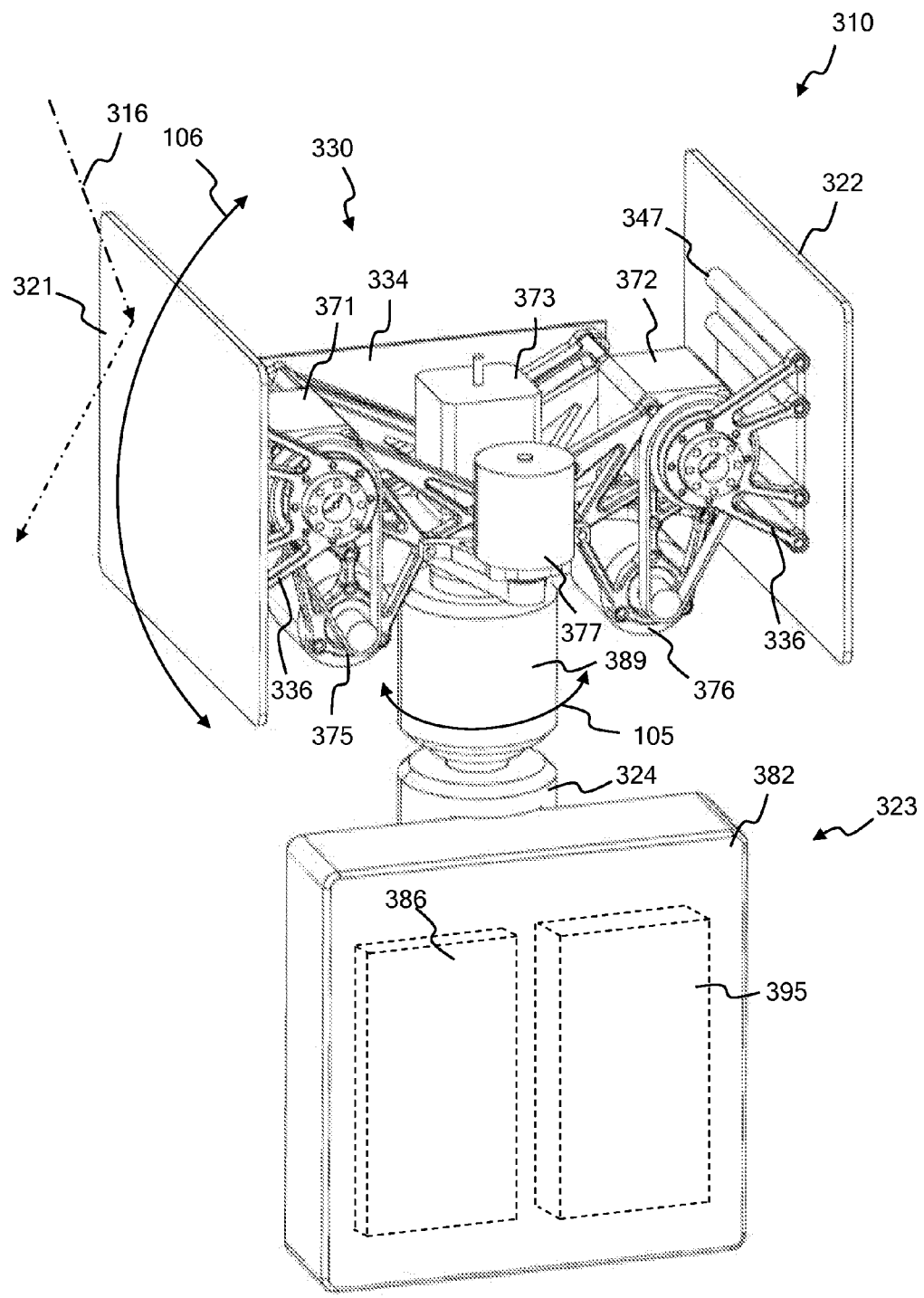
FIG. 3 shows a front perspective view of a pest deterrent apparatus.
Figure 4:
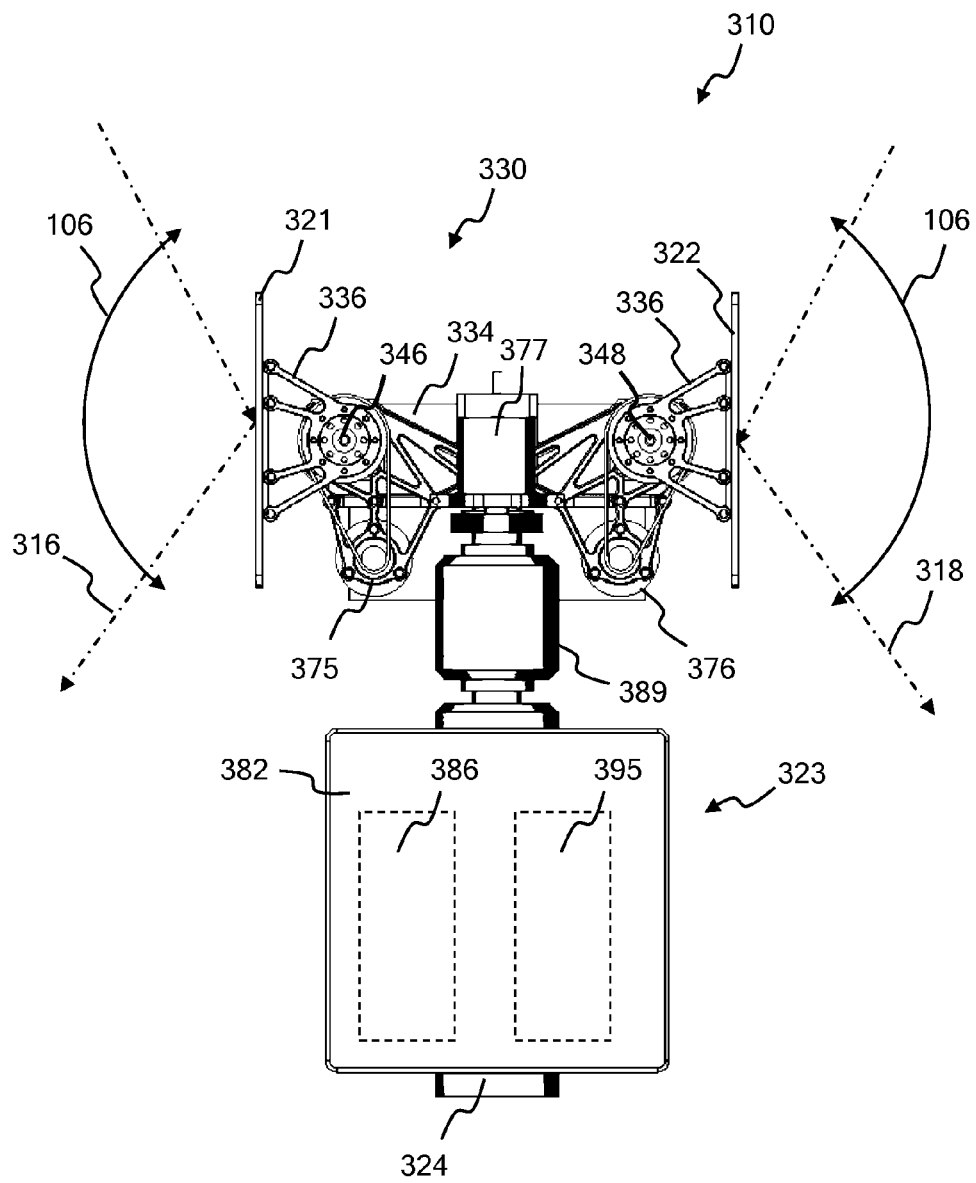
FIG. 4 shows a side view of the pest deterrent apparatus of FIG. 3.
Figure 5:
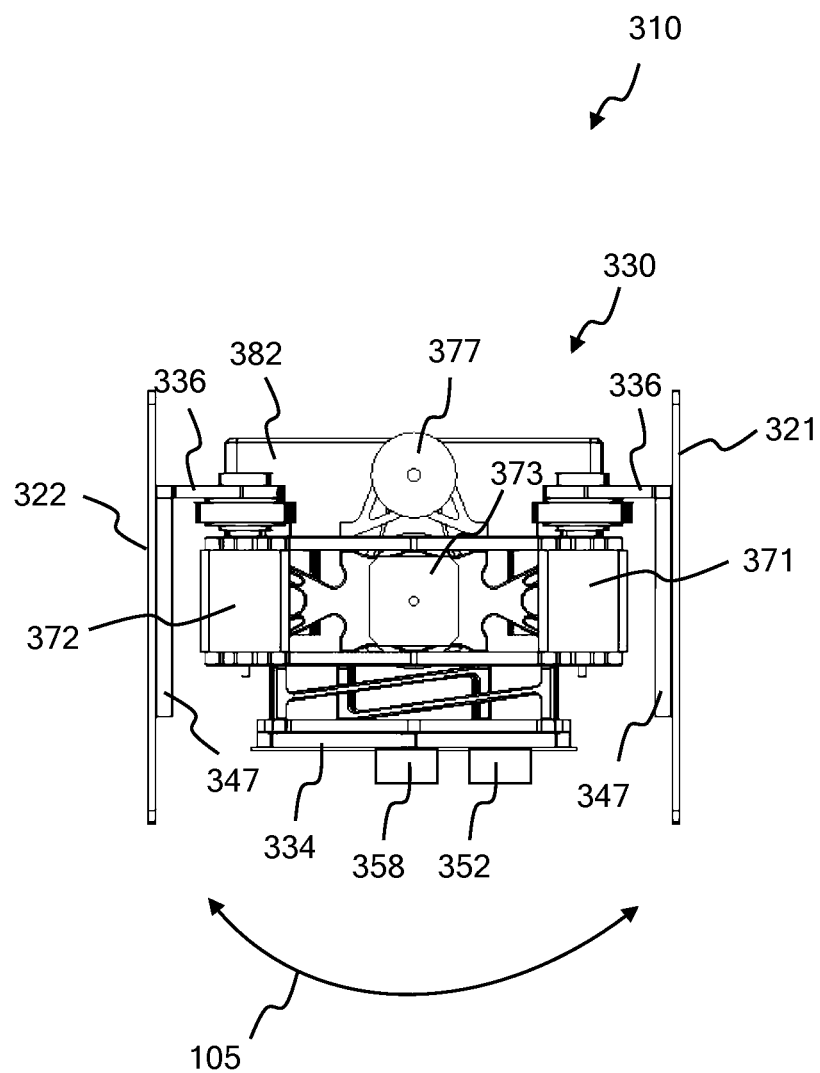
FIG. 5 a top view of the pest deterrent apparatus of FIG. 3.
Figure 6:
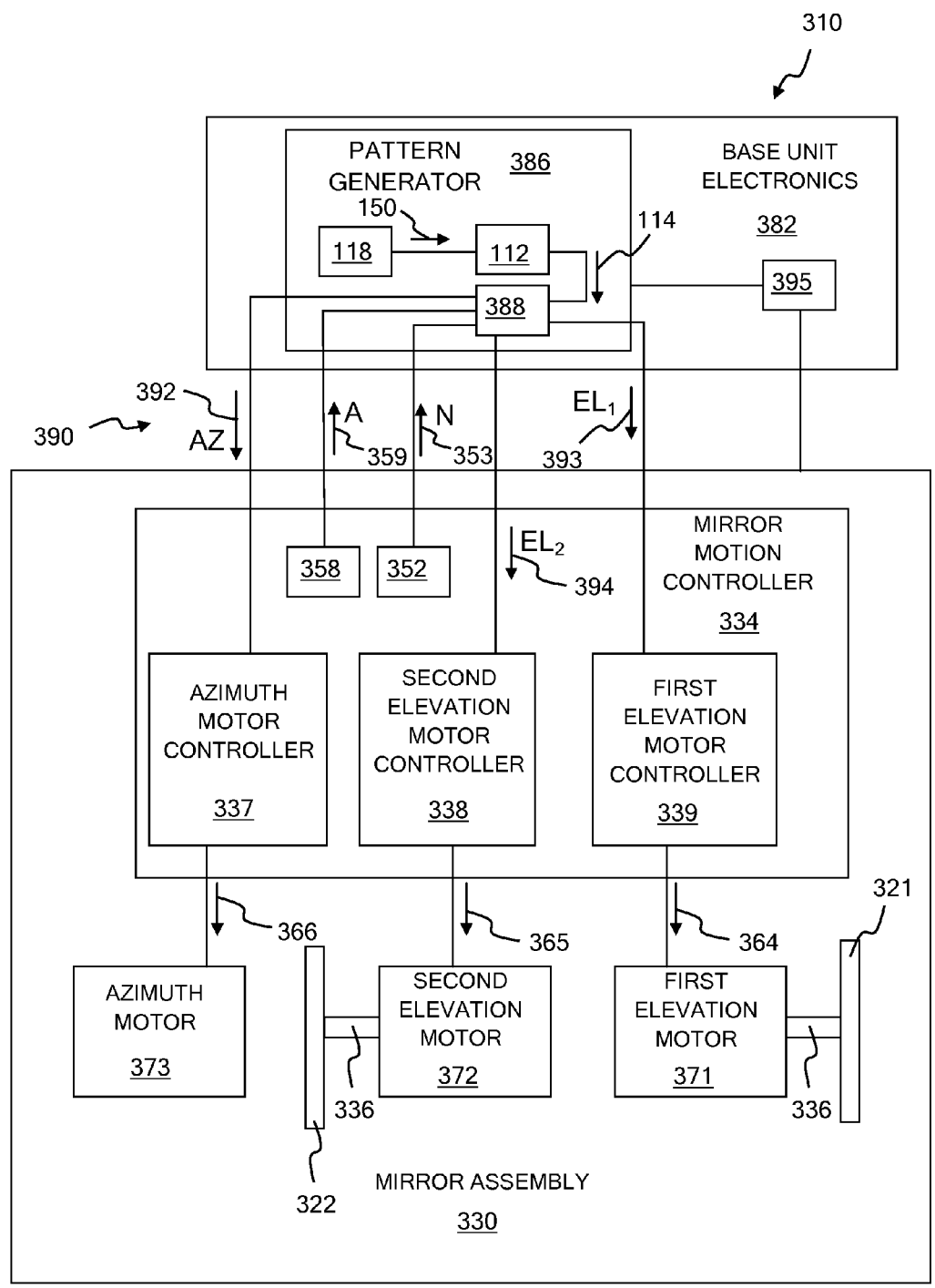
FIG. 6 shows a simplified block diagram of the pest deterrent apparatus of FIG. 3.
Figure 7:
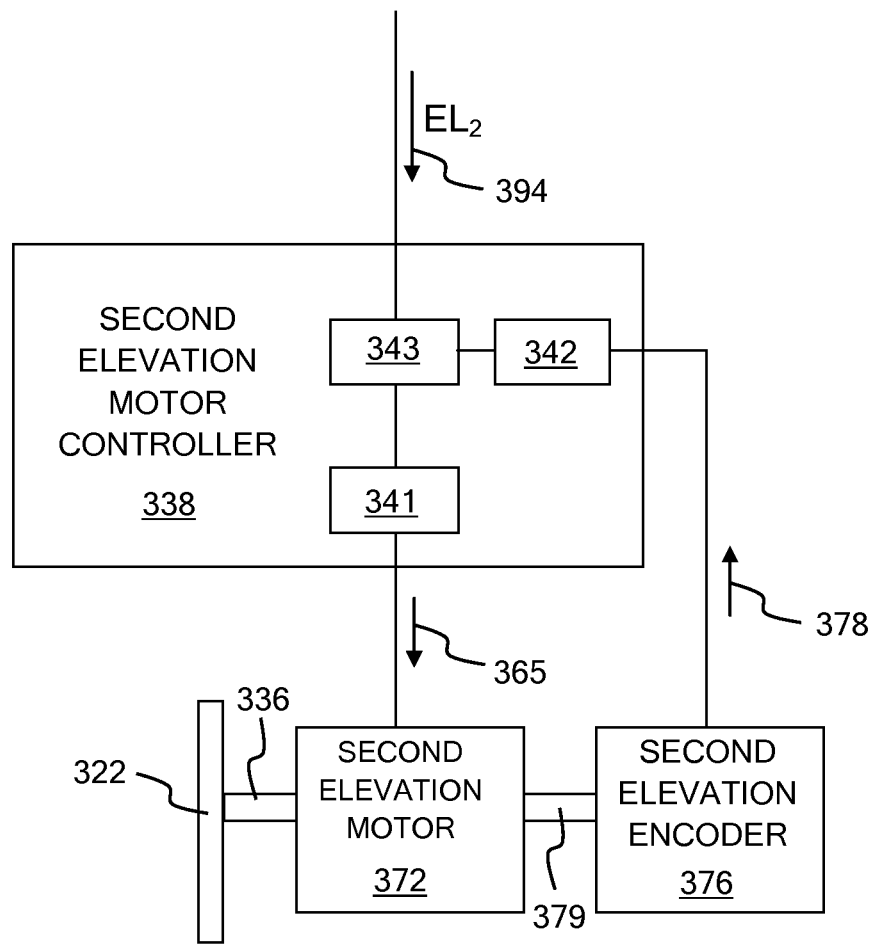
FIG. 7 shows a simplified block diagram of an elevation motor controller.
Figure 8:
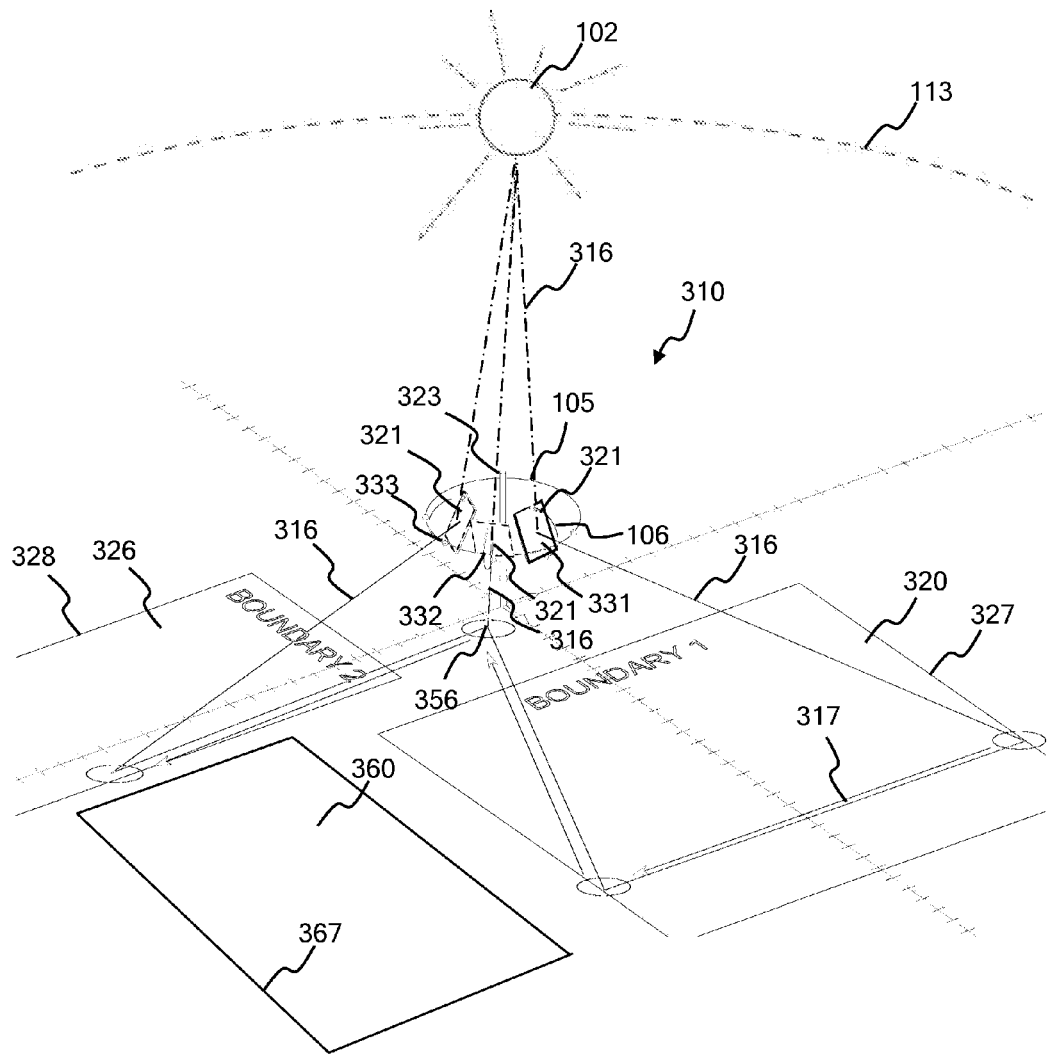
FIG. 8 shows a simplified top perspective view of the pest deterrent apparatus of FIG. 3.

FIG. 3 shows a front perspective view of pest deterrent apparatus 310. FIG. 4 shows a side view of pest deterrent apparatus 310. FIG. 5 shows a top view of pest deterrent apparatus 310. FIG. 6 shows a simplified block diagram of pest deterrent apparatus 310 of FIG. 3. FIG. 7 shows a simplified block diagram of a second elevation motor controller 338 of pest deterrent apparatus 310 of FIG. 3. FIG. 8 shows a simplified drawing of pest deterrent apparatus 310 of FIG. 3 painting beam of sunlight 316 onto a first predetermined area of interest 320 and a second predetermined area of interest 326, and shows how mirror 322 directs beam of sunlight 316 into a blanking area 356 to prevent beam of sunlight 316 from painting a predetermined dark area 360.

Bird deterrent apparatus 310 includes a base unit 323 and a mirror assembly 330, and two mirrors, a first mirror 321 and a second mirror 322, see FIG. 3, FIG. 4, FIG. 5, and FIG. 6.

Each mirror 321 and 322 is moveably coupled to mirror assembly 330. Each mirror 321 and 322 rotates (tilts) in one axis of rotation relative to mirror assembly 330. In the embodiment shown in FIG. 3 through FIG. 8, mirrors 321 and 322 rotate in the elevational axis of rotation 106 relative to mirror mount 330, see FIG. 3 and FIG. 4. Mirror assembly 330 is rotatably coupled to base unit 323 (see FIG. 3 and FIG. 4). Base unit 323 couples bird deterrent apparatus 310 to the ground, to a trailer, or to another mounting device to hold bird deterrent apparatus 310 in place.

Mirror assembly 330 rotates in the azimuthal axis of rotation 105 with respect to base unit 332, as shown in FIG. 5, which provides the azimuth axis of rotation 105 of mirrors 321 and 322. Each mirror 321 and 322 rotates individually in second axis of rotation 106. Thus, each mirror 321 and 322 rotates in the azimuth 105 axis of rotation and the elevation 106 axis of rotation. In the embodiment where pest deterrent apparatus 310 replaces pest deterrent apparatus 110 as shown in FIG. 1, each mirror 321 and 322 rotate in the azimuthal axis of rotation 105 and the elevational axis of rotation 106 to paint beam of sunlight 116 from sun 102 onto predetermined area of interest 120. Birds 108 are startled by beam of sunlight 116, so that they do not land or gather in predetermined area of interest 120.

In the embodiment of pest deterrent apparatus 310 shown in the figures, axes of rotation 105 and 106 are orthogonal to each other, in other words, axis of rotation 105 is perpendicular to axis of rotation 106. The two-axis rotation of mirrors 321 and 322 is an example only, and it is to be understood that mirrors 321 or 322 can be made to move in many different axes, rotational movement, or other types of movement which can paint, using raster painting or vector painting, for example, beam of sunlight 116, for example, onto predetermined are of interest 120. Pattern 117 can be any type of pattern used to paint predetermined area of interest 120 with beam of sunlight 116.

Each mirror 321 and 322 can be used individually to paint beam of sunlight 116 onto predetermined area of interest 120, or mirrors 321 and 322 can be used cooperatively to paint beam of sunlight 116 onto predetermined area of interest 120. In some embodiments, beam of sunlight 116 reflects off of both mirror 321 and mirror 322 on its path to being painted onto predetermined area of interest 120. In some embodiments, first mirror 321 is used to paint a first beam of sunlight onto a first predetermined area of interest, and second mirror 322 is used to paint a second beam of sunlight onto a second predetermined area of interest. Mirrors 321 and 322 can be used in any manner to paint any number of beams of sunlight onto one or more predetermined areas of interest to deter birds or other pests from landing or gathering on one or more predetermined areas of interest.

The movement of mirrors 321 and 322, and the rotation of mirror assembly 330, is adjusted over time and as sun 102 moves in its path 113 across the sky. For example, in the embodiment where pest deterrent apparatus 310 is used in place of pest deterrent apparatus 110 of FIG. 1, the movement of mirrors 321 and 322 is adjusted such that beam of sunlight 116 continues to paint pattern 117 onto predetermined area of interest 120 as sun 102 moves. The movement of mirrors 321 and 322 repeatedly paints beam of sunlight 116 onto predetermined area of interest 120, and does not let beam of sunlight 116 be painted outside of area of interest 120, even as sun 102 moves across the sky. Mirrors 321 and 322 move such that beam of sunlight 116 paints predetermined area of interest repeatedly in a period of time that does not let pests get comfortable in predetermined area of interest 120. In some embodiments, mirrors 321 and 322 paint beam of sunlight 116 on the complete predetermined area of interest 120 once every second. In some embodiments, mirrors 321 and 322 paint beam of sunlight 116 on the complete predetermined area of interest 120 several times every second. In some embodiments, mirrors 321 and 322 paint beam of sunlight 116 on the complete predetermined area of interest 120 once every minute. The timing of the painting of beam of sunlight 116 onto predetermined are of interest is determined by the type and habits of the particular pests being deterred. In some embodiments, it may only be necessary to paint beam of sunlight 116 onto predetermined area of interest 120 every few minutes or hours. In some embodiments, it may be necessary to paint beam of sunlight 116 onto predetermined area of interest 120 repeatedly every second in order to deter a specific type of pests.

Base unit 323 includes a mounting base 324, and a mounting base electronics unit 382 coupled to mounting base 324. Mounting base 324 is the structural support for pest deterrent apparatus 310. Mounting base 324 sets on the ground, couples to the ground or another mounting structure, or otherwise holds mirror assembly 330 such that mirror assembly 330 can rotate with respect to mounting base 324 to paint beam of sunlight 116 onto predetermined area of interest 120, for example. Mirror assembly 330 rotatably couples to mounting base 324.

Base electronics unit 382 is an electronics enclosure mechanically mounted to mounting base 324, see FIG. 3 and FIG. 4. Base electronics unit 382, encases the electronics that are located remote from mirror assembly 330. In this embodiment, base electronics unit 382 encases and includes a pattern generator 386, and a power source 395. Power source 395 in this embodiment is batteries, but this is not meant to be limiting. Power source 395 can include solar panels, lead acid batteries, lithium polymer batteries, or any other power source suitable for supplying power to base unit electronics 382 and mirror assembly 330.

Pattern generator 386 is similar to pattern generator 186 described above, except in this embodiment pattern generator 386 outputs two elevation signals, one for each of first mirror 321 and second mirror 322. Pattern generator 386 is the electronics that computes the position of sun 102 in its path 113, the location of pest deterrent apparatus 310 on the earth, the position of predetermined area of interest 120 with respect to pest deterrent apparatus 310, and the movement of mirrors 321 and 322 required to paint a beam of sunlight onto a predetermined area of interest, such as beam of sunlight 116 and predetermined area of interest 120 as shown in FIG. 1, for example.

Pattern generator 386 includes sun position calculator 112, GNSS device 118, and a control signal generator 388 (FIG. 6). Sun position calculator 112 uses location signal 150 from GNSS device 118, and the time, to determine the azimuth and elevation position of sun 102, as explained above for pattern generator 186. This information is sent as sun position signal 114 to control signal generator 388. In some embodiments, sun position calculator 112 uses other devices or methods to determine the position of sun 102 in the sky.

GNSS device 118 provides location signal 150 to sun position calculator 112, as explained above for pattern generator 186. GNSS device 118 is included in pest deterrent apparatus 110 to provide the location of GNSS device 118, which can be used to determine the location of pest deterrent apparatus 310, mirrors 321 and 322, and any other elements of pest deterrent apparatus 310 which have known positions relative to GNSS device 118. GNSS device 118 computes location 150 of GNSS device 118 using signals from GNSS satellites, as is known in the art of GNSS devices. GNSS device 118 provides pest deterrent apparatus 310 the ability to determine its own location, and the location of sun 102 with respect to mirrors 321 and 322. Pest deterrent apparatus 310 can be moved from one field of crops to another, for example, and determine for itself where it is located, the position of sun 102 relative to itself, and its location relative to predetermined area of interest 120 or any other predetermined area of interest. Pest deterrent apparatus 310 will use GNSS device 118 to determine where pest deterrent apparatus 310 is located, and calibrate the movement of mirrors 321 and 322 based on location 150. GNSS device 118 increases the intelligence, flexibility, and accuracy of pest deterrent apparatus 310 relative to bird and pest deterrent devices which do not have GNSS devices.

In some embodiments, pest deterrent apparatus 310 includes more than one GNSS device 118. Multiple GNSS devices can be used to determine the attitude of one or more mirrors, the location of one or more mirrors, the attitude of pest deterrent apparatus 310, or the location or attitude of any number of the elements of pest deterrent apparatus 310. In some embodiments, GNSS device 118 is not located in the same location as mirrors 321 and 322. In these embodiments, the orientation of mirrors 321 and 322 with respect to GNSS device 118 is generally known and defined by the geometry of pest deterrent apparatus 310. The location of mirrors 321 and 322, and any other part or element of pest deterrent apparatus 310, can be computed based on the location 150 of GNSS device 118 and the known geometry of pest deterrent apparatus 310.

In some embodiments, pest deterrent apparatus 110 does not include GNSS device 118. In some embodiments the location of pest deterrent apparatus 310 can be programmed into sun position sensor 112, for example, or other elements of pattern generator 386.

Pattern generator 386 receives a magnetic North signal N from a compass 352 coupled to mirror assembly 330, and an accelerometer signal A from an accelerometer 358 coupled to mirror assembly 330. Magnetic North signal N is labeled 353 in the drawings. Accelerometer signal A is labeled 359 in the drawings. Magnetic North signal 353 and accelerometer signal 359 are used to help determine the location and attitude of mirrors 321 and 322, and pest deterrent apparatus 310 with respect to sun 102 and predetermined area of interest 120. Pattern generator 386 receives magnetic North signal 353 from compass 352, and accelerometer signal 359 from accelerometer 358 coupled to mirror assembly 330, and sends an azimuth signal AZ, a first mirror elevation signal $EL_1$, and a second mirror elevation signal $EL_2$ to mirror assembly 330 in response. Azimuth signal AZ is labeled 392 in the drawings. First elevation signal $EL_1$ is labeled 393 in the drawings. Second elevation signal $EL_2$ is labeled 394 in the drawings. Azimuth signal 392 and elevation signals 393 and 394 instruct mirror assembly 330 in the movements in azimuth axis of rotation 105 and elevation axis of rotation 106 required to paint beam of sunlight 116 onto predetermined area of interest 120.

Azimuth signal 392, first and second elevation signal 393 and 394, attitude signal 359, magnetic North signal 353, and power are electrically conducted from pattern generator 386 to mirror assembly 330 via a serial bus 390 (FIG. 6) that runs through slip ring 389 (FIG. 3 and FIG. 4). Slip ring 389 allows mirror assembly 330 to rotate in azimuthal axis of rotation 105 with respect to mounting base 324, while conducting the electrical signals and power between base unit electronics 382 and mirror assembly 330.

Control signal generator 388 is electrically coupled to mirror assembly 330 and sun position calculator 112. Control signal generator 388 is similar to control signal generator 188 described above, except control signal generator 388 outputs two elevation signals, one for each of mirror 321 and mirror 322. Control signal generator 388 receives sun position 114 from sun position calculator 112, and outputs azimuth signal 392 and first and a second elevation signal 393 and 394 in response. Control signal generator 388 uses sun position signal 114, magnetic North 353 from compass 352, and attitude 359 from accelerometer 358 to compute azimuth signal 392, first elevation signal 393, and second elevation signal 394. When pest deterrent apparatus 310 is used to replace pest deterrent apparatus 110 in the embodiment shown in FIG. 1, azimuth signal 392 and first and second elevation signals 393 and 394 provide the azimuthal and elevational rotation instructions for mirror assembly 330 and mirrors 321 and 322 to paint beam of sunlight 116 onto predetermined area of interest 120. Control signal generator 388 computes the rotation of mirror assembly 330 in the azimuthal axis of rotation 105, and in the elevational axis of rotation 106 needed to paint beam of sunlight 116 onto predetermined area of interest 120. Control signal generator 388 causes mirror assembly 330 and first and second mirrors 321 and 322 to move such that beam of sunlight 116 reflected off mirrors 321 and 322 is painted onto predetermined area of interest 120.

Sun position calculator 112 updates sun position 114 periodically so that the movement of mirror assembly 330 and first and second mirrors 321 and 322 can be adjusted to maintain beam of sunlight 116 in its painted pattern 117 as sun 102 moves in its path 113 across the sky (see FIG. 1). Sun position calculator 112 updates sun position 150 periodically, and pattern generator 388 adjusts the movement of mirror assembly 330 and first and second mirror 321 and 322 accordingly, by adjusting azimuth signal 192, first elevation signal 393, and second elevation signal 394 such that mirrors 321 and 322 paint beam of sunlight 116 onto predetermined area of interest 120 as sun 102 moves across the sky.

Mirror assembly 330 includes first and second mirrors 321 and 322, compass 352, accelerometer 358, and the motors and motion control devices for rotating both mirror assembly 330 and mirrors 321 and 322. Mirror assembly 330 rotates in the azimuthal axis of rotation 105 with respect to base unit 323, see FIG. 3 and FIG. 5. This azimuthal rotation 105 provides the azimuthal rotation 105 for both first and second mirror 321 and 322. First mirror 321 and second mirror 322 both rotate in the elevation axis of rotation 106, as shown in FIG. 3 and FIG. 4. First and second mirrors 321 and 322 rotate in the elevational axis of rotation 106 independently from one another, because they are each controlled their own elevation signal from control signal generator 388. First mirror 321 is controlled by first elevation signal 393, and second mirror 322 is controlled by second elevation signal 394. Using two mirrors 321 and 322 provides better mechanical balance to mirror assembly 330, and also provides for faster painting of beam of sunlight 116 onto a predetermined area of interest, because first and second mirror 321 and 322 can work cooperatively. Having each mirror 321 and 322 rotate in only one axis, in this embodiment the elevation axis of rotation 106, makes pest deterrent apparatus 310 sturdy and helps maintain positional accuracy of beam of sunlight 116. Mirror assembly 330 can rotate more than 360 degrees to provide quick movement in each azimuthal direction of rotation.

It is to be understood that in some embodiments mirror assembly 330 has one mirror. In some embodiments, the one mirror rotates or moves in more than one axis of rotation. In some embodiments, mirror assembly 330 includes more than two mirrors. The number and rotational capabilities of the mirrors included in mirror assembly 330 is determined by the number and size of the predetermined areas of interest to be painted by beam of sunlight 116, and the size and complexity of mirror assembly 330.

Mirror assembly 330 includes a mirror motion controller 334 (FIG. 3 through FIG. 6), which is the electronic circuit board that controls the rotation of mirror assembly 330 and mirrors 321 and 322. Mirror motion controller 334 also includes compass 352 and accelerometer 358 (FIG. 5 and FIG. 6). Mirror motion controller 334 is electrically coupled to pattern generator 386 through serial bus 390. Mirror motion controller 334 receives azimuth signal 392, first elevation signal 393 and second elevation signal 394 from pattern generator 386. Mirror motion controller 334 sends attitude signal 358 and magnetic north signal 353 to pattern generator 386. Compass 358 is mounted to mirror motion controller 334, and generates magnetic North signal 353. Magnetic north signal 353 provides the magnetic compass orientation of mirror motion controller 334 and mirror assembly 330. Accelerometer 358 is coupled to mirror motion controller 334, and generates attitude signal 359. Attitude signal 359 provides the attitude of mirror motion controller 334 and mirror assembly 330. Magnetic north signal 353 and attitude signal 359 are used by pattern generator 386 to generate azimuth signal 392 and first and second elevation signal 393 and 394.

Mirror assembly 330 includes three motors, an azimuth motor 373 (FIG. 3, FIG. 5, FIG. 6) which moves mirror assembly 330 in the azimuth axis of rotation 105, a first elevation motor 371 (FIG. 3, FIG. 5, FIG. 6), which moves mirror 321 in the elevation axis of rotation 106, and a second elevation motor 372 (FIG. 3, FIG. 5, FIG. 6, and FIG. 7), which moves second mirror 322 in the elevation axis of rotation 106.

Mirror motion controller 334 outputs an azimuth motor drive signal 366 (FIG. 6). Azimuth motor 373 receives azimuth motor drive signal 366 and rotates mirror assembly 330 in the azimuthal axis of rotation 105 in response. Mirror motion controller 334 outputs a first elevation motor drive signal 364 (FIG. 6). First elevation motor 371 receives first elevation motor drive signal 364 and rotates first mirror 321 in the elevational axis of rotation 106 in response. Mirror motion controller 334 outputs a second elevation motor drive signal 365 (FIG. 6 and FIG. 7). Second elevation motor 372 receives second elevation motor drive signal 365 and rotates second mirror 322 in the elevational axis of rotation 106 in response.

Each of first mirror 321 and second mirror 322 are coupled to their respective motors 371 and 372 with a mirror holder 347 and a mirror mount 336 (FIG. 3 through FIG. 7). Each mirror 321 and 322 is mechanically coupled to a mirror holder 347. Each mirror holder 347 is mechanically coupled to a mirror mount 336. Each mirror mount 336 is rotatably mechanically coupled to its respective motor 371 and 372. Each of first and second elevation motor 372 and 372 receives a drive signal 364 and 365, and mechanically rotates its mirror mount 336, which rotates each mirror holder 347, which rotates each mirror 321 and 322.

Mirror motion controller 334 includes an azimuth motor controller 337, a first elevation motor controller 339, and a second elevation motor controller 338. Each of azimuth motor controller 337, first elevation motor controller 339, and second elevation motor controller 338 convert the azimuth or elevation signals received from control signal generator 388 into motor drive signals 364, 365, and 366. Azimuth motor controller 337 is electrically coupled to control signal generator 388 of pattern generator 386, and azimuth motor 373. Azimuth motor controller 337 receives azimuth signal 392 from control signal generator 388, and outputs azimuth motor drive signal 366 in response.

First elevation motor controller 339 is electrically coupled to control signal generator 388 of pattern generator 386, and first elevation motor 371. First elevation motor controller 339 receives first azimuth signal 393 from control signal generator 388, and outputs first elevation motor drive signal 364 in response. Second elevation motor controller 338 is electrically coupled to control signal generator 338 of pattern generator 386, and second elevation motor 372. Second elevation motor controller 338 receives second elevation signal 394 from control signal generator 388, and outputs second elevation motor drive signal 365 in response.

Each elevation motor 371 and 372 is mechanically coupled to a motor encoder 375 and 376 (FIG. 3, FIG. 4, and FIG. 7), which provides positional feedback to motor controllers 338 and 339. FIG. 7 shows a simplified block diagram of second elevation motor 372 and encoder 376. First elevation motor 371 has a similar block diagram, not shown for simplicity. As shown in FIG. 7, second elevation motor controller 338 receives second elevation signal 394 from control signal generator 388 (FIG. 6). Second elevation motor controller 338 outputs second elevation motor drive signal 365 in response. Second elevation motor controller 338 includes an elevation microcontroller 343 and an elevation motor driver 341. Elevation microcontroller 343 is electrically coupled to control signal generator 388 and motor driver 341 as shown in FIG. 7, and receives second elevation signal 394. Motor driver 341 is electrically coupled to second elevation motor 372 and elevation microcontroller 343, and provides second elevation drive signal 365 to second elevation motor 372.

Second elevation motor 372 is rotatably mechanically coupled to mirror 322 (through mirror mount 336) and to second elevation encoder 376 (through elevation driver 379). Second elevation encoder 376 is rotated by second elevation motor 372 as second elevation motor 37 rotates mirror 322. Second elevation encoder 376 provides electrical feedback on the position of this rotation to encoder input buffer 342, which in turn passes this input to microcontroller 343. In this way, second elevation motor controller 338 provides second elevation motor drive signal 365 to second elevation motor 372, and receives positional feedback on the rotation position of second elevation motor 372 through second elevation encoder 376, which enhances the rotational accuracy of second mirror 322. First elevation mirror 321 is similarly coupled to first elevation encoder 375 (FIG. 3 and FIG. 4), and azimuth motor 373 is similarly coupled to azimuth encoder 377 (FIG. 3, FIG. 4, FIG. 5).

FIG. 8 shows how pest deterrent apparatus 310 prevents a beam of sunlight 316 from being painted onto a predetermined dark area 360. FIG. 8 shows pest deterrent apparatus 310, in simplified form, painting beam of sunlight 316 onto predetermined areas of interest 320 and 326. Many of the structural elements of pest deterrent apparatus 310 are not shown in FIG. 8 for simplicity. In this embodiment, first mirror 321 is painting two predetermined areas of interest, first area of interest 320, and second area of interest 326, with beam of sunlight 316. In FIG. 8, mirror 321 is shown in three different positions in its azimuthal rotation 105. Mirror 321 as shown in first position 331, paints area of interest 320 with beam of sunlight 316. From third position 333, mirror 321 paints area of interest 326 with beam of sunlight 316. When mirror 321 is in between first position 331 and third position 333, for example in second position 332, mirror 321 prevents beam of sunlight 116 from being painted onto predetermined dark area 360. Pest deterrent apparatus 310 can use many different techniques to prevent beam of sunlight 316 from being painted onto predetermined dark area 360. In the embodiment shown in FIG. 8, mirror 321 directs beam of sunlight 316 into blanking area 356 to prevent beam of sunlight 316 from being painted onto predetermined dark area 360. Control signal generator 388 moves mirror 321 such that beam of sunlight 116 is directed to blanking area 356 as mirror 321 moves from first position 331 to second position 333, so that beam of sunlight 316 is prevented from hitting predetermined dark area 360.

Predetermined dark area 360 may be an area where there are houses, buildings, people, other animals, or other items which can be harmed or annoyed by beam of sunlight 316. Control signal generator 388 of pattern generator 386 is programmed to keep predetermined dark area 360 from receiving beam of sunlight 316. In this embodiment control signal generator 388 instructs first elevation motor controller 339 to move mirror 321 such that beam of sunlight 316 is prevented, or blocked, from painting predetermined dark area 360.

In some embodiments, perimeter 367 of predetermined dark area 360 is defined by GNSS coordinates. In some embodiments, perimeter 327 of predetermined area of interest 320 is defined by GNSS coordinates. In some embodiments perimeter 328 of predetermined area of interest 326 is defined by GNSS coordinates. Pattern generator 386 designs a pattern 317 to be used for painting beam of sunlight 316, based on perimeters 327 and 328 of predetermined areas of interest 320 and 326, which are to receive beam of sunlight 316, and perimeter 367 of dark area 360, which is to be blocked from receiving beam of sunlight 316. This capability allows pest deterrent apparatus 310 to be safe and flexible, painting beam of sunlight 316 where birds are to be deterred, and blocking beam of sunlight 316 from entering predetermined dark area 360 where beam of sunlight 316 is unwanted or can cause damage.

Predetermined dark area 360 can have any physical or locational relationship to predetermined area of interest 320 or 326. In some embodiments, predetermined dark area 360 is entirely contained within predetermined area of interest 320 or 326. In some embodiments, predetermined dark area 360 is entirely outside of predetermined area of interest 320 or 328, as is shown in FIG. 8. In some embodiments, predetermined dark area 360 is partially contained within one of predetermined area of interest 320 or 326.

It is to be understood that predetermined areas of interest 320 and 326, and predetermined dark area 360, can be any size and shape. In some embodiments, pest deterrent apparatus 310 paints beam of sunlight 316 onto more than two predetermined areas of interest. In some embodiments, pest deterrent apparatus 310 blocks beam of sunlight 316 from being painted onto more than one predetermined dark area 360. In some embodiments, pest deterrent apparatus 310 is programmed to block any of a plurality of beams of sunlight from being painted onto one or more predetermined dark areas.

Pest deterrent apparatus 310 can be moved to any location near the predetermined areas of interest where pests such as birds are not wanted. Pattern generator 386 of pest deterrent apparatus 310 determines the location of mirrors 321 and 322 using location 150 of GNSS device 118, magnetic North signal 353 from compass 352, and mirror assembly attitude signal 359 from accelerometer 358. Pattern generator 386 is programmed with the location of all of the predetermined areas of interest which birds are to be deterred from, and the predetermined dark areas where beams of sunlight are to be blocked from. Sun position sensor 112 determines the position of the sun 102 in its path 113 across the sky (see FIG. 1 and FIG. 8), and provides sun position $P_{sun}$ 114 to control signal generator 388. Control signal generator 388 computes how to move each of mirrors 321 and 322 such that each one paints one or more of the plurality of beams of sunlight onto one or more predetermined areas of interest. Control signal generator 388 determines how to move mirrors 321 and 322 so that none of the plurality of beams of sunlight are painted onto the predetermined dark areas. Thus, birds and other pests are kept from landing, gathering, and doing damage to the predetermined areas of interest, and the plurality of beams of sunlight are blocked from being painted onto the plurality of dark areas.

Having more than one mirror, as shown with pest deterrent apparatus 310, is advantageous because it allows the use of multiple mirrors to be used to paint a particular beam of sunlight onto a particular predetermined area of interest. In some positions of the sun, it may require reflections off two or more mirrors to get the particular beam of sunlight to the predetermined area of interest. Control signal generator 388 can, for example, switch from moving one particular mirror to moving another particular mirror to paint a beam of sunlight, as sun 102 moves across the sky. In some embodiments, control signal generator 388 will move two or more mirrors such that a beam of sunlight reflects off of each of the two or more mirrors in its path to the predetermined area of interest.

In some uses of pest deterrent apparatus 110 or 310, more than one pest deterrent apparatus 110 or 310 is used to relay one or more beam of sunlight from one location to another. This can be advantageous when one or more beam of sunlight need to be delivered to an area of interest that is shielded from the sun, such as behind a hill or building. A particular beam of sunlight can be relayed from a first pest deterrent apparatus 110 or 310, to a second pest deterrent apparatus 110 or 310, to the predetermined area of interest. In some embodiments more than two pest deterrent apparatuses 110 or 310 can be used.

Figure 9:
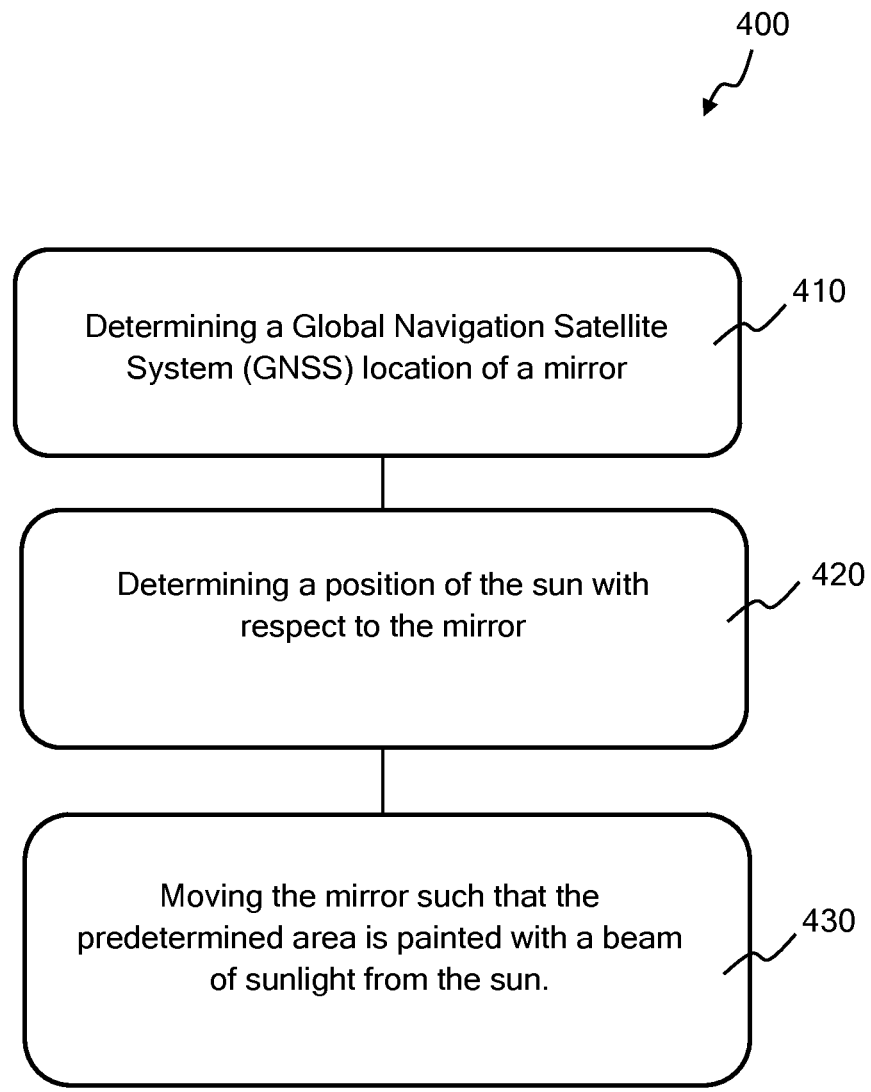
FIG. 9 illustrates a method of preventing birds from landing in a predetermined area of interest.

FIG. 9 illustrates a method 400 of deterring birds from landing in a predetermined area. Method 400 includes an act 410 of determining a global navigation satellite system (GNSS) location of a mirror. Method 400 also includes an act 420 of determining a position of the sun with respect to the mirror. Method 400 also includes an element 430 of moving the mirror such that the predetermined area is painted with a beam of sunlight from the sun.

Method 400 can include many other acts. In some embodiments, the predetermined area is a predetermined area of interest. In some embodiments, the predetermined area is a predetermined area of the earth. For example, the predetermined area can be an area on one or more buildings, an area in the sky, on a boat or another structure. The predetermine area can be an area of the earth, an area in the earth, an area of crops, for example but not by way of limitation. In some embodiments, method 400 includes adjusting the movement of the mirror in response to a change in the position of the sun. In some embodiments, method 400 includes repeating the step of moving the mirror such that the predetermined area of the earth is repeatedly painted with the beam of sunlight from the sun as the sun moves across the sky. In some embodiments, method 400 includes preventing the mirror from painting a predetermined dark area with the beam of sunlight. In some embodiments, method 400 includes switching from moving the first mirror to moving a second mirror in response to a change in a position of the sun, wherein the second mirror paints the area of interest with the beam of sunlight. In some embodiments, method 400 includes determining the orientation of the mirror. In some embodiments, method 400 includes mechanically coupling a gyroscope to the mirror. In some embodiments, method 400 includes mechanically coupling an accelerometer to the mirror. In some embodiments, method 400 includes determining the orientation of the mirror based on data from the gyroscope or the accelerometer. In some embodiments, method 300 includes determining the GNSS coordinates of a perimeter of the predetermined area. In some embodiments, method 400 includes determining the GNSS coordinates of a perimeter of the predetermined dark area.

Act 410 of determining a GNSS location of a mirror can include many other elements. In some embodiments, act 410 includes determining the GNSS location of the mirror based on a GNSS location of a GNSS device.

Act 420 of determining the position of the sun with respect to the mirror can include many other steps. In some embodiments, element 420 includes determining the position of the sun with respect to the mirror using compass data. In some embodiments, element 420 includes determining the position of the sun with respect to the mirror using compass data and GNSS location data. In some embodiments the compass is mechanically coupled to the mirror.

Element 430 of moving the mirror such that the predetermined area is painted with a beam of sunlight from the sun can include many other elements. In some embodiments, moving the mirror includes moving the mirror with a stepper motor. In some embodiments, moving the mirror includes moving the mirror with a motor actuator. In some embodiments moving the mirror includes moving the mirror with two motor actuators.

Described are embodiments of a pest deterrent apparatus which uses one or more moving mirrors to paint one or more beams of sunlight onto a predetermined area of interest in order to deter pests such as birds from landing or gathering in the predetermined area of interest. Keeping the pests from gathering in the predetermined area of interest keeps the birds and other pests from damaging crops, buildings, land, or other items in the predetermined area of interest. A GNSS device and a compass are used to determine the position of the sun with respect to the pest deterrent apparatus. An accelerometer coupled to the mirror assembly is used to determine the orientation of each mirror. The location and orientation of the mirrors is used to determine the movement of the mirrors required to paint the predetermined area of interest with the one or more beams of sunlight. The mirrors can repeatedly paint the predetermined area of interest with one or more beams of sunlight so that pests are continuously deterred. An updated position of the sun and an updated orientation of the one or more mirror are used to adjust the movement of the mirrors so that the predetermined area of interest continues to be painted with the beam or beams of sunlight as the sun moves across the sky. The pest deterrent apparatus can be programmed to block the one or more beams of sunlight from being painted onto a predetermined dark area, so that the predetermined dark area can be protected from receiving beams of sunlight. This allows a predetermined dark area that may include people, animals, buildings or other items that should not receive the beams of sunlight to be protected from receiving the beams of sunlight. The perimeters of both the predetermined area of interest and the predetermined dark areas can be defined in terms of GNSS coordinates.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A pest deterrent apparatus comprising:
   a sun position calculator, wherein the sun position calculator outputs a sun position;
   a mirror assembly, wherein the mirror assembly comprises a mirror; and
   a control signal generator electrically coupled to the mirror assembly and the sun position calculator, wherein the control signal generator causes the mirror to move such that a beam of sunlight reflected off the mirror is painted onto a predetermined area of interest in response to the sun position calculator outputting the sun position.

2. The pest deterrent apparatus of claim 1, wherein the pest deterrent apparatus comprises a global navigation satellite system (GNSS) device.

3. The pest deterrent apparatus of claim 2, wherein the sun position calculator receives a global navigation satellite system (GNSS) location from the GNSS device.

4. The pest deterrent apparatus of claim 1, wherein the mirror assembly comprises a compass.

5. The pest deterrent apparatus of claim 4, wherein the compass provides a magnetic North signal to the control signal generator.

6. The pest deterrent apparatus of claim 1, wherein the mirror assembly comprises an accelerometer.

7. The pest deterrent apparatus of claim 6, wherein the accelerometer provides an attitude signal to the control signal generator.

8. The pest deterrent apparatus of claim 1, wherein the sun position calculator updates the sun position periodically, and wherein the control signal generator adjusts the movement of the mirror periodically such that the mirror paints the beam of sunlight onto the predetermined area of interest as the sun moves across the sky.

9. The pest deterrent apparatus of claim 1, wherein the control signal generator moves the mirror such that the beam of sunlight is prevented from hitting a predetermined dark area.

10. A method of preventing birds from landing in a predetermined area comprising:
    determining a global navigation satellite system (GNSS) location of a bird deterrent apparatus, wherein the bird deterrent apparatus comprises a mirror;
    determining a position of the sun with respect to the bird deterrent apparatus; and
    moving the mirror such that a beam of sunlight reflects off the mirror and is painted onto the predetermined area.

11. The method of claim 10, further comprising adjusting the movement of the mirror in response to a change in the position of the sun.

12. The method of claim 11, further comprising repeating the step of moving the mirror such that the predetermined area continues to be painted with the beam of sunlight as the sun moves across the sky.

13. The method of claim 10, further comprising preventing the mirror from painting a predetermined dark area with the beam of sunlight.

14. The method of claim 10, further comprising switching from moving the first mirror to moving a second mirror in response to a change in a position of the sun, wherein the second mirror paints the predetermined area with the beam of sunlight.

15. The method of claim 11, further comprising determining the attitude of the mirror with an accelerometer.

16. The method of claim 10, further comprising determining the GNSS coordinates of a perimeter of the predetermined area.

17. A bird deterrent apparatus comprising:
    a base unit comprising:
      a sun position calculator, wherein the sun position calculator outputs a sun position; and
      a control signal generator; wherein the control signal generator receives the sun position from the sun position calculator, and outputs an azimuth signal and an elevation signal in response;
    and
    a mirror assembly rotatably coupled to the base unit, wherein the mirror assembly comprises:
      a mirror rotatably coupled to the mirror assembly;
      a mirror motor mechanically coupled to the mirror, wherein the mirror motor rotates the mirror with respect to the mirror assembly; and
      a mirror motion controller electrically coupled to the mirror motor, wherein the mirror motion controller controls the rotation of the mirror;
    wherein the mirror motion controller instructs the motor to move the mirror such that a beam of sunlight is reflected off of the mirror onto a predetermined area of interest, in response to the mirror motion controller receiving the azimuth signal and the elevation signal from the control signal generator.

18. The bird deterrent apparatus of claim 17, wherein the mirror assembly rotates the mirror about a first axis of rotation.

19. The bird deterrent apparatus of claim 18, wherein the mirror motor rotates the mirror about a second axis of rotation.

20. The bird deterrent apparatus of claim 19, wherein the first axis of rotation is perpendicular to the second axis of rotation.

\* \* \* \* \*